J. C. TIFFANY.

Apparatus for Manufacturing Illuminating-Gas.

No. 5,324. Reissued March 11, 1873.

Witnesses,
Calvin Page
Geo. W. Haven

Inventor,
Joseph Caspar Tiffany

AM. PHOTO-LITHOGRAPHIC CO. N.Y. (OSBORNE'S PROCESS.)

UNITED STATES PATENT OFFICE.

JOSEPH CAPRON TIFFANY, OF PORTSMOUTH, NEW HAMPSHIRE.

IMPROVEMENT IN APPARATUS FOR THE MANUFACTURE OF ILLUMINATING-GAS.

Specification forming part of Letters Patent No. 133,391, dated November 26, 1872; reissue No. 5,324, dated March 11, 1873.

*To all whom it may concern:*

Be it known that I, JOSEPH CAPRON TIFFANY, of Portsmouth, county of Rockingham and State of New Hampshire, have invented a new and Improved Retort-Furnace; and I do hereby declare that the following is a full and exact description of the same, reference being had to the drawing annexed.

*Nature and Object of the Invention.*

The nature of my invention is that of a furnace, containing in its interior a fire-chamber of fire-brick, between which and the walls or shell of the furnace is placed a non-conducting material, with a peculiar arrangement of a heated air-chamber, and a peculiar mode of supporting my retort; and the object is to make a retort-furnace for the production of gases from oil in which all the heat applied shall be utilized, while the whole apparatus is made more durable and convenient.

*Description of the Invention.*

Figure 1:
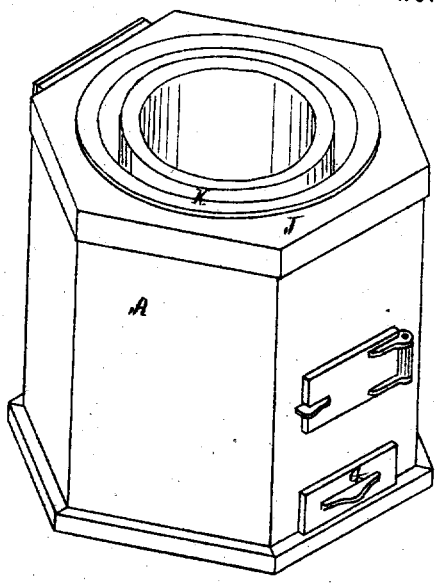
Figure 1 is a view in perspective of my improved retort-furnace.
Figure 2:
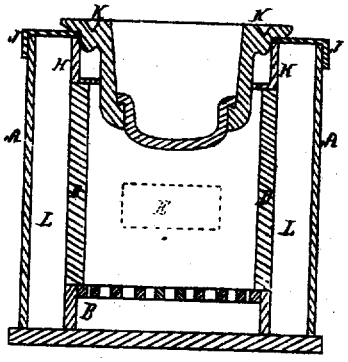
Fig. 2 is a vertical section of the same.
Figure 3:
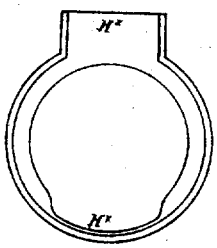
Fig. 3 is a view from above of the grate-bars and their supporting apparatus.
Figure 4:
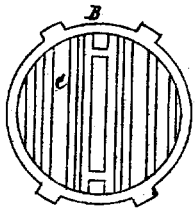
Fig. 4 is a view of a peculiar ring, hereinafter more fully described, which in part supports the retort.

In the drawing, A, Fig. 1, (A A, Fig. 2,) is the shell or outer wall of my furnace, composed of six oblong rectangular slabs of iron, placed vertically upon one of their shorter sides, respectively, upon a thick hexagonal-shaped slab of metal, seen in Fig. 1, which forms the bottom of my furnace, the slabs forming in horizontal section the figure of a hexagon. One of these slabs bears (see Fig. 1) a furnace-door, made in the usual manner, and also an aperture below, closed at pleasure by the iron casting G, seen in Fig. 1, which represents the damper ordinarily used in stoves. B, Figs. 2 and 4, is a ring called the grate-ring. This supports the grate C, Fig. 3, which is made, as seen in Fig. 3, of a ring (fitting into a corner groove of the ring B) which carries, cast upon it, several cross-bars, (with the exception of the two middle ones, which are separate and removable.) D D is the fire-chamber, shown in vertical section in Fig. 2. It is made of fire-brick, and is cylindrical in shape, with neither top cover nor bottom piece. This fire-chamber is placed, with its axis perpendicular, upon the grate-ring B and the ring of the grate C which supports it, and it reaches up to within a short distance of the top of the shell A. At E, Fig. 2, is seen in dashed lines the location of an oblong perforation in the front side of the fire-chamber, which perforation is, as will be seen by Fig. 1, opposite the door of the furnace-shed. The object of this perforation E is to admit the passage of fuel through the door F into the body of the fire-chamber. H H, Fig. 2, is the air-chamber ring, seen in vertical section $H^x$ $H^z$. Fig. 4 shows the same, in view from above. This air-chamber ring is a double ring, being formed by one flat ring joined, they being cast together at its periphery with an upright cylindrical ring. The flat ring lies, when in position, upon the top or upper edge of the fire-brick cylinder or fire-chamber D D, and its central aperture is of larger radius—for, say, one hundred and twenty degrees of a circle—than the rest of the circular hole, (see $H^x$, Fig. 4,) at that point which comes at the front side of my apparatus. At the opposite side, (see $H^z$, Fig. 4,) the flat ring is widened, forming a sheaf, which passes into an oblong-shaped hole of a box-like device, (see Fig. 1,) which is cast on the top portion of the back slab of the shell A, and is the flue or chimney of my apparatus. The cylindrical ring of the double ring H H reaches up to the same height with the top of the six slabs which form the outer shell A of the furnace. Upon the top edges of the air-chamber ring H H and of the shell A rests the cover J J, Fig. 2, in vertical section, J, Fig. 1. This is a flat piece of metal, hexagonal in shape, as seen in Fig. 1, which bears, cast upon it, proceeding downward from its outer edge, a projection of such form as would be made by pressing up a short cylinder into shape, hexagonal, as viewed in the line of its axis. This projection makes the side or sides of the cover, and fits not very closely round the top part of the shell A. This cover J bears at its center a circular aperture, into which fits the retort K K, Fig. 2, (K, Fig. 1.) As this retort has been fully described by me in the specification of Letters Patent of the United States issued to myself under date August 13, 1872, no particular description of it is needed here. In general terms it is a frusto-conical tub with a horizontal outer flange at the top and a movable bottom. The flange at the top of the retort lies upon the upper surface of the cover J J, Fig. 2, and the lower portion of the retort passes through the circular aperture of the air-chamber ring H H, Fig. 2, which, the shape of that part of the retort being conical, helps, with the cover J J, to support it. The space L L, Fig. 2, between the fire-chamber and the shell, is filled with a non-heat conducting material.

*Operation of the Invention.*

The different parts of my device being in position, and the retort charged with oil, a fire is kindled by way of the door F and the aperture E upon the grate C. The heated air and smoke arising pass with full force to the under side of the bottom of the retort. The flat portion of the double ring H H interposing an obstruction to its upward passage, the heated air finds its only mode of egress through the aperture $H^x$, Fig. 4, in the front part of the flat ring; thence it has no mode of reaching the flue at $H^z$, except by passing inside the cylindrical portion of the double ring H H to right and left round the sides of the retort, the contents of which are thus still further heated, the heat being thus fully utilized. Having passed through the flue at $H^z$, the heated air and smoke go up the chimney. Should the double ring become expanded by the heat, and thus the cylinder which forms the upper ring of the same be lengthened, the cover J, Fig. 1, which it supports, rising with it, slides its hexagonal sides up the sides of the shell, and still holds the slabs of the shell together; this part of my device being thus adjustable to any degree of heat.

The intense heat necessary to gasify the oil has, in other devices, often destroyed the shell of a retort-furnace, which shell also conducts away a large portion of the needed heat. By my arrangement of the non-conducting wall between my fire-chamber and shell, I obviate these disadvantages.

I do not claim, broadly, a non-conductor interposed between two shells composing a gas-furnace, within which are suspended or arranged one or more retorts, as such is old and well known, it being set forth in James Rennie's English patent, dated September 5, 1850, wherein he provided for the loss of heat in such furnaces and to overcome the rending of the outer shell by contraction and expansion; but

What I claim as my invention is—

1. A conducting or air-chamber, arranged within a gas-furnace at or near its top, created between the outside surface of the retort and a flanged ring forming a continuation of the wall of the inner furnace, whereby the heat is retained upon the retort and egress formed for the passage of the products of combustion around the upper portion of the retort, substantially as described.

2. In retort-furnaces, the combination of the grate-ring B and the air-chamber ring H with the fire-chamber D and the retort K, substantially as described, for the purpose specified.

3. In a gas-furnace in which is employed a suspended retort, an adjustable top, J, having a depending flange for surrounding the outside shell of the furnace, for compensating for contraction and expansion.

4. The combination of the adjustable top J with the air-chamber ring H, substantially as described, for heating and supporting the retort.

5. Concentrating the heat of the inner furnace upon the retort, and protecting the outer shell from being destroyed by the heat of the inner furnace, by means of a non-conductor arranged on the inside or interposed between the fire-walls of the inner furnace and the outer shell of a gas-furnace.

6. A non-conductor interposed directly between the fire-walls of the inner furnace and the outer shell of a gas-furnace, for the purpose of concentrating the heat in the inner furnace upon the retort and protecting the outer shell from being destroyed by the intense heat of the inner furnace.

7. The combination and arrangement of the fire-chamber D, the non-conducting substance forming or interposed between the fire-chamber and the shell A, and the enveloping-furnace-shell A, when constructed and arranged substantially as described.

In testimony whereof I have hereunto set my hand this 7th day of March, A. D. 1873.

JOSEPH CAPRON TIFFANY.

Witnesses:

ALBERT H. NORRIS,
WM. J. PEYTON.